Aug. 28, 1962 C. D. RICHARDSON ET AL 3,050,787
METHOD FOR MAKING ARMATURE CONDUCTOR BAR
Filed March 4, 1959
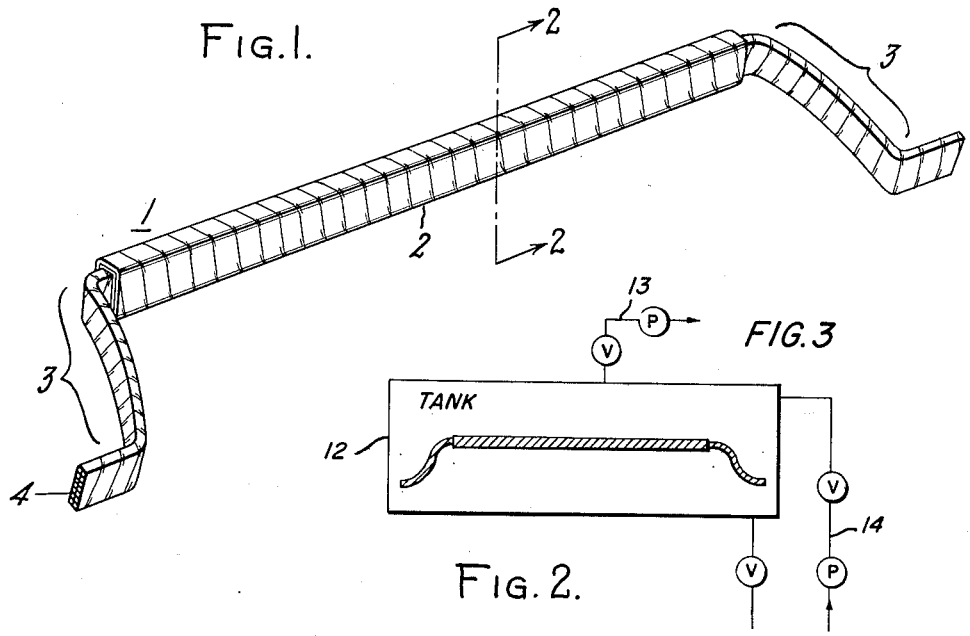
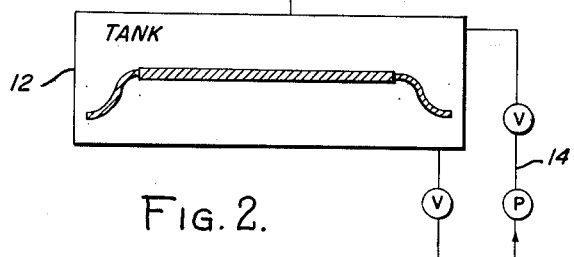
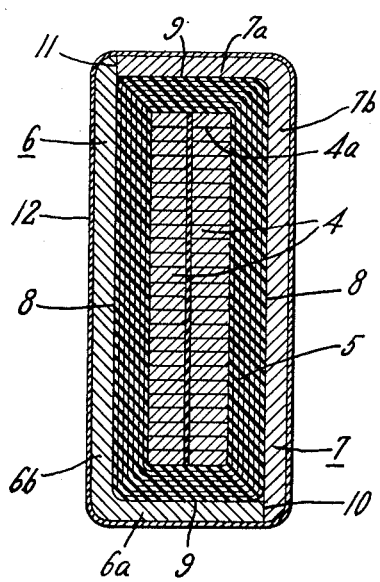
INVENTORS
CHARLES D. RICHARDSON
JOSEPH M. JASNIEWSKI
BY
THEIR ATTORNEY United States Patent Office 3,050,787
Patented Aug. 28, 1962

3,050,787
METHOD FOR MAKING ARMATURE CONDUCTOR BAR
Charles D. Richardson, Ballston Lake, and Joseph M. Jasniewski, Scotia, N.Y., assignors to General Electric Company, a corporation of New York
Filed Mar. 4, 1959, Ser. No. 797,159
4 Claims. (Cl. 18—59)

This invention relates to an improved method for making an armature conductor bar and more particularly it relates to manufacturing an improved high-voltage insulated conductor bar which is properly shaped for use in the winding slots of a generator stator.

Mica tapes have been and still are a highly effective insulating material for use where high voltages are employed. The use of mica tapes, however, creates special problems in "compounding" or binding several layers of tape around the conductor bar strands in order to form a dense, highly compacted insulating structure which is free of voids and which is of uniform dimensions. Dimensional uniformity is necessary in order that the conductor bar will fit properly in the slots of a laminated core structure, for example in the armature core of a generator stator, and a compact, void-free structure is necessary in order to produce uniform dielectric characteristics throughout the conductor bar.

One satisfactory method which has been employed in the past is to utilize a "vacuum-pressure" treatment in order to first remove volatile material from the insulation and then to achieve impregnation of the mica insulating tape under pressure. To accomplish this, the conductor bar which was wrapped with the insulating tape, was placed in a pressure-tight tank and a vacuum produced in the tank to remove volatile substances. Thereafter, the impregnating fluid, preferably molten asphalt, was introduced to the tank under pressure and allowed to impregnate the tape under pressure to form a compact insulation. Although the resulting dimensional uniformity of the insulation was poor, it was possible to reheat the bar individually until the asphalt became plastic and to mechanically re-shape the stator bar cross-section in a mold for this purpose.

Later developments led to the use of a thermosetting resin rather than asphalt in order to "bind" the insulating tape around the conductor strands in a compact structure. Due to the desired propensity of the thermosetting resin to "cure" into a rigid structure at an elevated temperature, it was no longer possible to reheat the stator bar to correct dimensional irregularities once it had been cured.

One solution to the dimensional problem is to cure the thermosetting resin in a mechanical mold which shapes the slot portion of the conductor bar. Due to the irregular shape of the end turn portion of the bar, however, the use of a mechanical mold on this portion becomes impractical. Moreover, the slot portions and end turn portions of the bar must be subjected to uniform pressure while the thermosetting resin cures. Failure to cure the end turns under the same pressure as the slot portion will result in poorly bonded end turns and dielectrically inferior insulation. Therefore, the continued use of a pressure-tight "compound" tank employing pressurized liquid to compress and compact both the end turn and the slot portions of the conductor bar insulation becomes a practical necessity.

Accordingly, one object of the invention is to combine the desirable features of mechanical molding to mold a portion of an insulated conductor and the advantages of hydraulic pressure to achieve dielectric uniformity over the entire insulation.

Another object of the invention is to describe a process for manufacturing a high-voltage insulated conductor bar having a smooth uniformly dimensioned slot portion and dielectrically uniform end portions and slot portions.

Another object is to provide an improved generator stator bar utilizing a thermosetting resin binder and having an accurately dimensioned slot section.

The invention is practiced by encasing the slot section of the stator bar in a pressure-constrictable mold and placing around the mold a heat-shrinkable material which will constrict to compress the mold around the slot portion of the bar as the temperature is raised. The entire assembly is placed in a pressure-tight tank and the stator bar compressed both by the mold and by a pressurized high temperature liquid which is introduced into the tank.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a perspective view of a generator stator bar which has been manufactured according to the invention;

FIG. 2 is a cross-sectional view taken along the lines 2—2 of FIG. 1; and

FIG. 3 is a schematic view of the bar in a liquid pressure tank.

Referring now to FIG. 1, a stator bar shown generally as 1, is composed primarily of a straight slot portion 2 of generally rectangular cross-section and irregularly shaped end turn portions 3 also of generally rectangular cross-section. The stator bar 1 comprises one half of a turn in the armature winding and is manufactured as a half turn, as shown, due to its size and weight. Another stator bar (not shown) will be placed in the armature core during assembly and extending strands of copper 4 will be connected to form a complete armature turn.

The end turn portions 3 follow a complex curve in order to allow the bar to be attached to supporting structure in order to be in the proper position for connecting to the next stator bar.

Referring now to FIG. 2, a cross-section taken through the slot portion 2 of the stator bar reveals conductor strands 4 enclosed by multiple strands of mica insulating tape 5. The conductor strands 4 are separately insulated by strand insulation 4a and may themselves be either solid, or hollow strands. The particular type of conductor strand used is immaterial to the process of the present invention.

The insulating tape 5 must be able to continuously withstand very high voltages on the order of, for example, 18 kilovolts. In the particular embodiment shown, mica insulating tape is preferably utilized which will continuously withstand approximately 1 kilovolt per layer of tape. Thus for an 18-kilovolt requirement, 18 layers of insulating tape 5 would be required. Only seven layers are illustrated in FIG. 2 for purposes of clarity.

Insulating tape 5 has been coated and impregnated with a thermosetting resin which acts as a "binder" for the successive layers of tape which are compacted to an extremely dense and highly effective insulation. Application of pressure and heat are necessary to achieve the best qualities in the cured and compacted insulation.

In order to achieve dimensional uniformity during the curing process, a pressure-constrictable mold, shown here simply as two opposed angle pieces 6, 7, are placed around the slot portion 2 of the stator bar. The angle pieces 6, 7 are composed here of ordinary carbon steel but may be of any material which will withstand the curing temperatures and still retain their shape. As seen in FIG. 2, the vertical sides 8 of the slot section 2 will lie between the armature core slot sides when the stator bar is in position with the horizontal side 9 resting on the bottom of the slot. Due to the wedge which holds the stator bar in the armature slot, some dimensional variation is permissible in the top-to-bottom direction as measured from the surface 9. Dimensional variation in the direction of the width between the sides 8 will, however, result in the stator bar binding in the stator slot with possible ensuing damage to the insulation, or will result in the bar fitting loosely in the armature slot. Therefore, angles 6, 7 are placed as shown so that as pressure is applied to the angles they will achieve a minimum predetermined width of the stator bar when the short legs 6a, 7a of the angles come to the stop positions against the long legs 6b, 7b of the opposing angles as illustrated at 10 and 11. Continued restriction of the mold as for example, under hydraulic pressure as later explained will allow constriction of the enclosed slot portion 2 in the top-to-bottom dimension only, the more critical slot transverse dimension being held uniform as determined by the short legs 6a, 7a of angle pieces 6, 7.

Around the pressure constrictable mold is wrapped a layer of heat-shrinkable material. Such a material which is suitable for this use is sold under the name of Mylar by E. I. du Pont de Nemours & Co., Wilmington, Delaware, and has the desirable characteristic that it can be "oriented" by pre-stretching at room temperature or elevated temperatures and will subsequently shrink when heat is applied. Substantial shrinkage can be achieved by orienting the Mylar tape and, within the strength limits of the tape, the tape will apply gradually increasing pressure against any restraining object as it shrinks.

A layer of heat-shrinkable tape 12 is shown surrounding angle pieces 6, 7 in FIG. 2. It will be appreciated that shortening of the tape 11 which is wrapped around the angle pieces will apply a constricting force to the angle pieces and cause them to subsequently apply a gradual pressure to the enclosed stator bar. Inasmuch as the stator bar layers of insulation 5 are not in a compacted state during curing, the pressure of angle pieces 6, 7 will constrain the insulation to assume the shape of the interior surface of the angle pieces.

Depending upon the liquid to be used during the pressurizing process, the entire assembly may also be wrapped with a "sacrifice" tape or covering in order to prevent the contamination of the insulation by the hydraulic pressurizing liquid. There are many protective materials on the market which can be used for this purpose and the use of such a "sacrifice" tape is not necessarily pertinent to the practice of the present invention.

Referring to FIG. 3, the prepared stator bar is then placed in a pressure-tight tank 12 and the tank is evacuated through pipe 13. The successive layers of insulating tape and the layers of heat-shrinkable tape will open up slightly similar to the action of a one-way valve to allow any volatile materials which may be caught between layers of tape or which may be evolved during heating to escape from the assembly. During the vacuum process, the tank is heated in order to cause the heat shrinkable material to apply gradually increasing pressure on the mold. For example, if Mylar tape is utilized, the Mylar will begin to shrink as the temperature of the tank approaches approximately 80° C. The shrinkage continues as the temperature rises to apply a steadily increasing pressure to angle pieces 6, 7. The shrinking of the Mylar is aided by the fact that the thermosetting binder which coats and impregnates the insulating tape 5 is in a semi-plastic state which causes it to yield to the pressure applied by the angle pieces. At approximately 120°, the hydraulic pressurizing fluid, molten asphalt at approximately 150° C. and 100 p.s.i. pressure is pumped into the pressure-tight tank through pipe 14. The mechanical molding process of the slot portion 2 has nearly completed its first stage due to the heat shrinkable tape and now enters its second stage as the pressurized hydraulic fluid is applied to the complete stator bar 1. The hydraulic pressure induced by the molten asphalt is applied of course both to the mold encompassing slot portion 2 and to the unmolded end turn portions 3. The viscous nature of the asphalt prevents it from entering between layers of sacrifice tape which have closed up as pressure is applied. Thus an ultimately uniform pressure is applied to the stator bar with resulting dielectrically uniform slot sections and end turn portions. In practice, a number of prepared stator bar assemblies will be placed in the vacuum-pressure tank at one time. Thus economies of operation are afforded by making it unnecessary to interrupt the vacuum-pressure process to remove the stator bars and form them in a mechanical mold as has been suggested.

It only remains to completely cure the thermosetting resin by leaving the stator bar in the tank under pressure for the time required to cure the insulation to the thermoset state, which may be on the order of 5 hours. The resulting insulation on curing will be a rigid uniformly dimensioned structure.

Thus it may be seen that the invention successfully combines the desirable features of mechanical molding with the equally desirable ability of hydraulic pressure to apply a pressure to an irregular shape. The foregoing process has resulted in a much improved stator bar over previous methods of forming such insulated bars and has resulted in a slot section of uniform dimensions with an electrical uniformity throughout.

Various modifications of the invention will occur to those skilled in the art. For example, although the invention is particularly useful where thermosetting binders are used inasmuch as there is an inability to reform the insulation once it has cured, the above method may be advantageously applicable to conductor bars utilizing thermoplastic binders such as asphalt, in order to reduce the manufacturing cost of the re-forming step.

In addition, the end turn portions may be improved in appearance by applying a smooth flexible strip along two sides of the end turn and wrapping with the heat shrinkable tape. Although this does not allow complete dimensional control, it aids in providing a pleasing appearance for the exposed end turns.

While there has been described what is at present considered to be the preferred embodiment of the invention, it will be understood that various modifications may be made therein, and it is intended to cover in the appended claims all such modifications as fall within the true scope of this invention.

What we claim as new and desire to secure by Letters Patent of the United States is:

1. The method of manufacturing a high voltage insulated conductor bar to a desired transverse dimension for use in the winding slots of an armature core comprising the steps of providing a conductor bar having taped insulation impregnated with curable resin in an uncured state, enclosing the slot portion of said conductor bar in a pressure-constrictable mold including rigid members constructed to conform to the transverse dimension of said armature winding slots and to hold the conductor bar to said transverse dimension when the mold is constricted, covering said pressure-constrictable mold with a heat shrinkable material, subjecting said conductor bar to gradually increasing temperature to cause the heat shrinkable material to gradually constrict said mold, immersing the conductor bar in a liquid, maintaining said liquid at a pressure to compact said taped insulation in both the mold-enclosed and the unenclosed portions of the conductor bar to effect binding of the taped insulation and to shape the winding slot portions of the conductor bars with the pressure-constrictable mold, and curing said resin while the slot portions are held to the transverse dimension and while the total conductor bar is under hydraulic pressure.

2. The method of manufacturing a high voltage insulated conductor bar to a desired transverse dimension for use in the winding slots of an armature core comprising the steps of providing an insulated conductor bar having successive layers of insulation coated and impregnated with thermosetting resin in an uncured state, enclosing the slot portion of said conductor bar in a pressure-constrictable mold constructed to conform to the transverse dimension of said winding slots in its constricted position, covering said pressure-constrictable mold with a heat shrinkable material, subjecting the assembly to a gradually increasing temperature to cause the heat shrinkable material to gradually constrict said mold, immersing the conductor bar in a liquid, maintaining said liquid at a temperature exceeding the cure temperature of said thermosetting resin and at a pressure exceeding the heat-shrinking molding pressure to compact the insulating layers throughout the conductor bar and to shape the slot portion with the pressure-constrictable mold while curing the thermosetting resin throughout the bar.

3. The method of manufacturing a high voltage insulated conductor bar to a desired transverse dimension for use in the winding slots of an armature core comprising the steps of providing an insulated conductor bar having successive insulating layers coated and impregnated with a thermosetting resin binder, enclosing the slot portion of said conductor bar in a pressure-constrictable mold constructed to conform to the transverse dimension of said winding slots in its constricted position, covering said pressure-constrictable mold with a heat shrinkable material, placing said conductor bar in a pressure tight tank and reducing pressure on the conductor bar so as to remove volatile material, simultaneously heating said tank to cause the heat shrinkable material to constrict said mold, introducing into the tank a viscous fluid, maintaining said fluid at a pressure exceeding that imposed on the mold by the heat shrinkable material and at a temperature exceeding the cure temperature of said thermosetting resin to compact the entire conductor bar insulation under uniform hydraulic pressure and to shape the slot portion with the pressure-constrictable mold while curing thermosetting resin.

4. The method of manufacturing a generator stator conductor bar for use in the armature slots of the stator core comprising the steps of providing a conductor bar having electrically conductive strands wrapped with a plurality of layers of mica insulating tape, said insulating tape being covered and impregnated with a thermosetting resin binder, applying a protective layer of non-permeable substance over said insulating tape, enclosing the slot portion of said conductor bar in a pressure-constrictable mold, said mold being comprised of two mutually opposing angle pieces forming an enclosure conforming approximately to the shape of said armature winding slots, covering said pressure-constrictable mold with a heat shrinkable material, placing said conductor bar in a pressure tight tank and reducing pressure on the conductor bar so as to remove volatile material while simultaneously heating said tank to cause the heat shrinkable material to constrict said mold, introducing into the tank molten asphalt, maintaining said asphalt at a pressure exceeding that imposed on the mold by the heat shrinkable material and at a temperature exceeding the cure temperature of said thermosetting resin to compact the entire conductor bar insulation under uniform hydraulic pressure and to shape the slot portion with the pressure-constrictable mold while curing the thermosetting resin.

References Cited in the file of this patent
UNITED STATES PATENTS

| | | |
|---|---|---|
| 1,377,517 | Novotny | May 10, 1921 |
| 2,235,906 | Skoning | Mar. 25, 1941 |
| 2,406,843 | Luth et al. | Sept. 3, 1946 |
| 2,444,903 | Van Buren | July 6, 1948 |
| 2,581,862 | Johnson et al. | Jan. 8, 1952 |
| 2,601,243 | Botts et al. | June 24, 1952 |
| 2,656,290 | Berberich et al. | Oct. 20, 1953 |
| 2,675,421 | Dexter | Apr. 13, 1953 |
| 2,922,734 | Kohn et al. | Jan. 26, 1960 |